Oct. 6, 1931.   T. V. BUCKWALTER   1,826,503
METHOD OF LOCATING LOMOTIVE AXLES
Filed Oct. 24, 1930    2 Sheets-Sheet 2

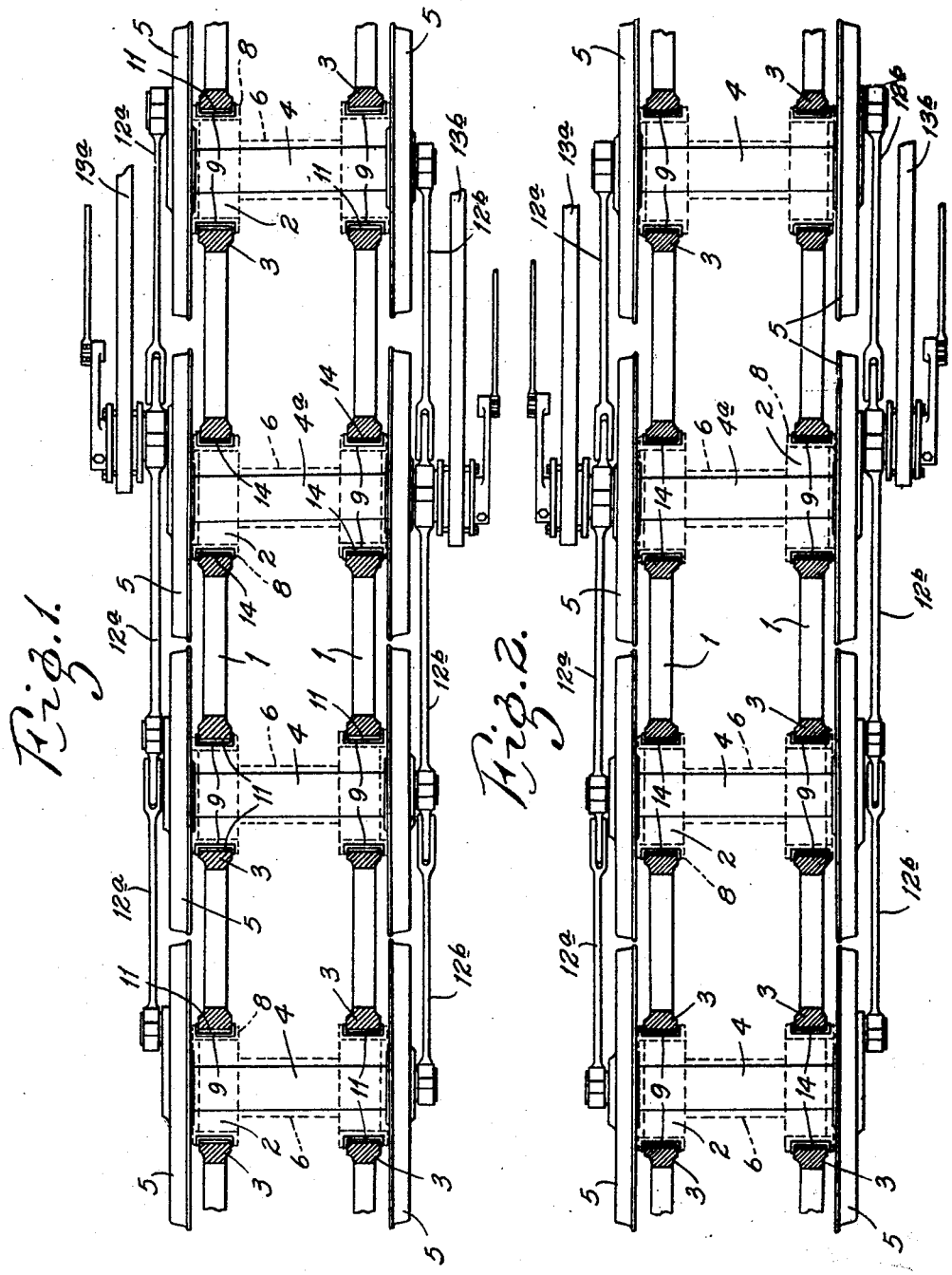

Fig. 3.

Fig. 4.

INVENTOR:
Tracy V. Buckwalter
HIS ATTORNEYS.

Patented Oct. 6, 1931

1,826,503

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

METHOD OF LOCATING LOCOMOTIVE AXLES

Application filed October 24, 1930. Serial No. 490,936.

This invention relates to a method of locating and mounting axles in locomotive frames to suit the main and side rod centers. In the assembling of locomotives, slight variations and irregularities in frame dimensions and other related parts make it extremely difficult to properly set and locate the axles permanently in the frame to properly suit the main and side rod centers and at the same time have a proper fit in the frame openings; and the principal object of this invention is to devise a simple method for overcoming this difficulty.

My invention consists principally in setting the rods on one side of a locomotive frame on dead center, then squaring the main driving axle with the frame and then permanently fixing both ends of said axle in this position by suitable means, then permanently fixing the remaining axles to place in the frame openings at their ends at which the side rods are on dead center, and finally setting the side rods on the other side of said frame on dead center and while in this position permanently fixing the remaining ends of the axles. My invention further consists in providing a locomotive frame with axle housing or journal box receiving openings of sufficient size so as to enable the axle housings or journal boxes when being assembled in the frame to have a loose fit in said openings and be capable of longitudinal movement therein for alteration of the location of said axles. My invention also consists in the method and in the steps hereinafter described and claimed.

In the accompanying drawings wherein like reference symbols refer to like parts wherever they occur, Fig. 1 is a diagrammatic sectional view of a locomotive frame taken horizontally through the middle of the frame openings with a complete axle and wheel assembly loosely mounted therein, the side rods on one side of said frame (shown at the top of figure) being set on dead center; and Fig. 2 is a similar view with the exception that the side rods on the other side of the frame are set on dead center and all of the axles have been permanently fixed in the frame;

Fig. 3 is an end view, with parts broken away, and the wheel removed, of one end of an axle and housing placed in a frame opening showing the means used for altering the location and permanently mounting said axle in the frame; and Fig. 4 is a plan view of one end of an axle mounted in a frame opening showing part of the housing, wear plates and frame in section.

While my invention is applicable to all types of locomotive construction it is particularly applicable to locating axles in a frame of the type disclosed in Patent No. 1,722,035 for a truck issued July 23, 1929, and for the purpose of illustrating the present invention I prefer to show a truck of similar construction comprising side frames 1 provided with jaw openings 2 defined by pedestals 3. Axles 4, with wheels 5 provided thereon, are mounted in housings 6, the ends of which extend in the openings 2. In order to provide for extreme flexibility of the truck, cylindrical trunnions 7 protrude from each side of the axle housings 6 and extend into openings provided in slidable channel-shaped guides 8 whose flanges extend on either side of the pedestals 3, and a suitable wear plate 9 is interposed between the guides and the pedestals. The load is carried from the wheels to the frame by means of an equalizer 10 (shown in dotted lines in Fig. 3) the ends of which bear on suitable seats provided on the top of the axle housing and the center of which support the springs (not shown) which carry the frame.

In carrying out my method, the openings provided in the locomotive frame for receiving the axle housings are of such a size, that the length thereof is slightly greater than the combined length of the axle housings, guides and wear plates, and thus slight clearance is provided on both ends of the opening for allowing slight longitudinal movement of the axles with respect to the frame when assembling the axles in the frame.

In order to definitely locate the axles, the complete axle and wheel assembly is placed loosely in the frame and the side rods 12a and 12b, main rods 13a and 13b and other related parts are then assembled and mounted on the wheels 5. The rods 12a and 13a on one side of the frame are then set on dead center (shown at the top of Fig. 1) and the main driving axle 4a is then accurately squared up with the frame by any suitable means, and is then permanently fixed and held in this position by means of shims 14 which are wedged in the space 11 between the wear plate and the pedestal on either side of the jaw opening and held therein by any suitable means such as welding 15 along the top and bottom. In this connection, it is obvious that all of the axle housings and jaw openings are of similar construction and similar means is used for altering the location and permanently fixing the ends of all the axles.

The remaining ends of the axles at the one side only at which the rods 12a and 13a are on dead center are then permanently located and shimmed, and it is obvious that since the main driving axle 4a is square with the frame and the rods at that end placed on dead center before permanently locating the axles, the axles at that end will be properly located to suit the rod centers.

In order to locate the remaining axles on the other side of the frame, the rods 12b and 13b at that side are then set on dead center as shown in Fig. 2, and the ends of the remaining axles are then shimmed and permanently fixed in the hereinabove described manner.

My method is simple, relatively cheap and efficient and when axles have been set and permanently located by this method the main driving axle will be square with the frame, the side rods will operate freely and they will have no tendency to bend or bind and their correct setting with reference to piston travel is definitely secured and maintained. It is a practical impossibility to cast a locomotive frame that is accurate and true in all dimensions, and since my method makes the axles fit properly in the frame notwithstanding the inaccuracies thereof, the advantages of my invention are obvious.

What I claim is:

1. The method of locating axles in a frame wherein the axles are provided with wheels which are connected with side rods, which consists in setting the side rods on one side of said frame in a dead center position, squaring one of the axles with the frame, permanently fixing both ends of said axle in said frame, then permanently fixing the ends of the remaining axles at the side of said frame on which the side rods are in the dead center position, and then setting the side rods on the other side of said frame on dead center and permanently fixing the remaining ends of said axles.

2. The method of locating axles in a frame wherein one of the axles is a main driving axle adapted to receive main rods and both of which are provided with wheels which are connected with side rods, which consists in setting the side rod and main rod on one side of said frame in a dead center position, squaring the main driving axle with the frame, permanently fixing both ends of said axle in said frame, then permanently fixing the end of the other axle at the side of said frame on which the side rod is in the dead center position, and then setting the side rod on the other side of said frame in a dead center position and permanently fixing the remaining end of said axle.

3. The method of locating axles in a locomotive frame wherein the axles are provided with wheels on which are assembled main and side rods, which consists in setting the main and side rods on one side of said locomotive frame in a dead center position, squaring the main driving axle with the frame, permanently fixing both ends of said main driving axle in said frame, then permanently fixing the ends of the remaining axles at the side of said frame on which the side rods are set in the dead center position, and then setting the rods on the other side of said frame in a dead center position and permanently fixing the remaining ends of said axles in said frame.

4. The method of locating locomotive axles in a frame wherein the axles are provided with wheels adapted to receive side rods, which consists in placing the complete axle and wheel assembly in said frame which is adapted to receive the same loosely, assembling all of the side rods on said wheels, setting the side rods on one side of said frame in a dead center position, squaring one of the axles with the frame, permanently fixing both ends of said axle in said frame, then permanently fixing the ends of the remaining axles at the side of said frame on which the side rods are in the dead center position, and then setting the side rods on the other side of said frame on dead center and permanently fixing the remaining ends of said axles.

5. The method of locating locomotive axles in a frame wherein the axles are mounted in bearing housings at each end, and the ends of which are provided with wheels adapted to be connected with side rods, and wherein the frame is provided with bearing housing receiving openings each of which is of slightly greater length than the bearing housing which it is adapted to receive, which consists in placing the axle and wheel assembly in the frame, assembling the side rods, setting the side rods on one side of said frame in a dead center position, squaring one of the axles with the frame, permanently fixing both ends of said axle in said frame by inserting shims between the bearing housings and the walls of the frame openings, then permanently fixing in a similar manner the ends of the remaining axles at the side of said frame on which the side rods are in the dead center position, and then setting the side rods on the other side of said frame in a dead center position and permanently fixing by means of shims the remaining ends of said axles.

Signed at Canton, Ohio, this 21st day of October, 1930.

TRACY V. BUCKWALTER.